Sept. 22, 1942.  H. A. BEEKHUIS, JR  2,296,763
PROCESS FOR THE PRODUCTION OF CHLORINE AND METAL NITRATE
Filed Dec. 21, 1938  2 Sheets-Sheet 1
Fig. 1,
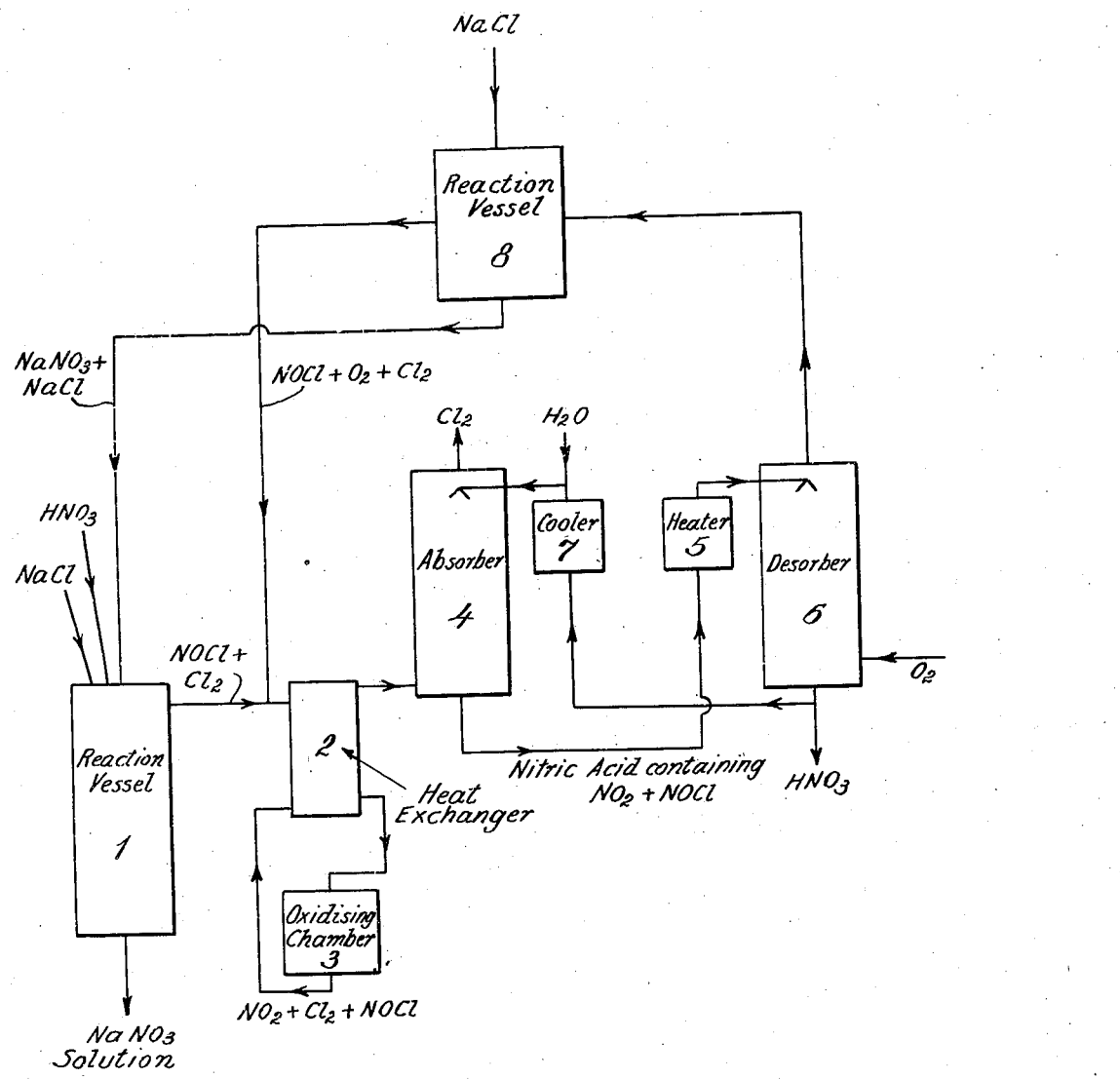

Sept. 22, 1942.    H. A. BEEKHUIS, JR    2,296,763
PROCESS FOR THE PRODUCTION OF CHLORINE AND METAL NITRATE
Filed Dec. 21, 1938    2 Sheets-Sheet 2

INVENTOR
Herman A. Beekhuis Jr.
BY
ATTORNEY

Patented Sept. 22, 1942

2,296,763

UNITED STATES PATENT OFFICE 2,296,763

PROCESS FOR THE PRODUCTION OF CHLORINE AND METAL NITRATE

Herman A. Beekhuis, Jr., Petersburg, Va., assignor to The Solvay Process Company, New York, N. Y., a corporation of New York Application December 21, 1938, Serial No. 247,087

10 Claims. (Cl. 23—102)

This invention relates to a process for the production of chlorine and metal nitrate from nitric acid and a metal chloride.

It is known that a metal nitrate may be produced by reaction of nitric acid and a metal chloride, such as sodium, potassium or calcium chloride, to form the corresponding metal nitrate and a gaseous mixture of nitrosyl chloride and chlorine. The chlorine may be recovered from this gaseous mixture and marketed as a product of the process. The nitrosyl chloride, however, is generally not marketable and hence numerous methods have been proposed heretofore for treating this nitrosyl chloride to recover its fixed nitrogen and chlorine contents. For example, it has been proposed to hydrolyze the nitrosyl chloride by means of water. This results in the chlorine and a part of the fixed nitrogen being recovered in the form of a dilute aqueous solution of nitric and hydrochloric acids which it has been proposed to introduce into the reaction mixture of nitric acid and metal chloride to reform nitrosyl chloride and chlorine by reaction of the two acids. Two-thirds of the fixed nitrogen content of the nitrosyl chloride is evolved as nitric oxide by the hydrolysis of the nitrosyl chloride and this may be utilized for the production of nitric acid to be used in the process. The introduction into the nitric acid-metal chloride reaction mixture of aqueous nitric and hydrochloric acid solution dilutes the reacting materials and deleteriously affects the progress of the reaction. The reaction of the nitric and hydrochloric acids does not produce the desired metal nitrate but, instead, only reforms nitrosyl chloride and chlorine which must again be subjected to the hydrolysis with water to recover a part of its fixed nitrogen content.

It is an object of this invention to provide a process for the production of metal nitrate and chlorine from nitric acid and metal chloride in which the nitrosyl chloride formed by reaction of the acid and metal chloride is treated to convert its combined chlorine and nitrogen content into free chlorine and metal nitrate in an advantageous manner.

In order to accomplish the foregoing objective of this invention, I react nitric acid and a metal chloride in any of the well known manners to form the metal nitrate with the evolution of the chlorine of the metal chloride as a mixture of nitrosyl chloride and chlorine. The nitrosyl chloride evolved by this reaction is oxidized forming nitrogen peroxide and chlorine. The nitrogen peroxide thus obtained is separated from the chlorine and is then reacted with a metal chloride under conditions resulting in the formation of metal nitrate and evolution of chlorine from the metal chloride substantially only as nitrosyl chloride. This reaction may be expressed by the following equation:

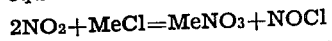

By reoxidizing the nitrosyl chloride formed by this reaction, separating the nitrogen peroxide from the chlorine in the oxidized gases and again reacting the nitrogen peroxide with metal chloride, all of the nitrosyl chloride produced by reaction of the nitric acid and metal chloride may be converted into metal nitrate and chlorine and the products of the process are metal nitrate and chlorine, both of which have a large market. If desired, two different metal nitrates may be produced by my process; one by reaction of the nitric acid and metal chloride, and the other by reaction of the nitrogen peroxide formed from the nitrosyl chloride. The two nitrates may be recovered separately or as a mixture.

My invention is not limited to any particular method or procedure for carrying out the individual steps of the process. Thus, the oxidation of the nitrosyl chloride may be carried out in any desired manner to form nitrogen peroxide and chlorine. Methods for reacting a metal chloride and nitrogen peroxide, either as gas or as liquefied nitrogen peroxide, are known and any such methods may be employed in this step of my invention.

The invention is illustrated by the following examples shown in the accompanying drawings of which Figs. 1 and 2 illustrate two modifications of the process of the invention:

*Example 1.*—With reference to Fig. 1, the numeral 1 designates a reaction vessel into which sodium chloride and nitric acid are fed and in which they are reacted to form sodium nitrate and a gaseous mixture of nitrosyl chloride and chlorine. This gaseous mixture is mixed with sufficient oxygen for the oxidation of the nitrosyl chloride and passed through a heat exchanger 2 and thence to an oxidizing chamber 3. The products of oxidation (nitrogen peroxide and chlorine containing any residual undecomposed nitrosyl chloride) are passed through heat exchanger 2 in indirect heat exchange with the nitrosyl chloride-chlorine gas on its way to oxidation chamber 3.

The gas from heat exchanger 2 is passed into the bottom of an absorber 4, after cooling the gas, if desired. Absorber 4 comprises a tower containing bubbling plates or packing material for insuring an intimate contact between the gases rising through the tower and a liquid introduced into the top of the tower and passed downwardly therethrough in countercurrent flow with the gases. In absorber 4 the gases are scrubbed with nitric acid containing about 60% to 90% HNO₃, preferably about 70% to 80% HNO₃, and having a temperature of about 20° to 40° C., preferably about 30° C. The nitrogen peroxide and nitrosyl chloride are absorbed in the aqueous nitric acid. There is a reaction between the nitrogen peroxide and chlorine in the gas and the water in the aqueous acid forming nitric acid and nitrosyl chloride. This nitrosyl chloride is also absorbed in the acid. Chlorine gas substantially free of nitrogen peroxide and nitrosyl chloride escapes from the top of absorber 4.

The nitric acid leaving absorber 4 containing nitrosyl chloride and nitrogen peroxide is passed through a heater 5 and thence into the top of a desorber 6, which is a tower containing bubbling plates or a packing material over which the nitric acid flows downwardly to the bottom of the desorber. The nitric acid is passed into desorber 6 at a temperature above about 50° C., preferably at about 60° C., and is contacted with oxygen gas introduced into the bottom of the desorber. Nitrogen peroxide and nitrosyl chloride are evolved from the solution treated in desorber 6 and nitric acid flowing from the bottom of the desorber after passing through a cooler 7 is returned to absorber 4 for treatment of the nitrogen peroxide, chlorine and nitrosyl chloride gas. Since nitric acid is formed in absorber 4 by reaction of nitrogen peroxide with water in the aqueous acid a portion of the acid leaving desorber 6 is withdrawn and water is mixed with the acid returned to absorber 4 to maintain the desired concentration of acid in the absorber.

The gases leaving desorber 6 contain oxygen, nitrosyl chloride, nitrogen peroxide and chlorine. These gases are passed through a reaction vessel 8 containing moist solid metal chloride; for example, sodium, potassium or calcium chloride. The nitrogen peroxide reacts with the metal chloride to form metal nitrate and nitrosyl chloride. When sodium chloride is introduced into reaction vessel 8 the nitrate formed is sodium nitrate. If desired, an excess of metal chloride may be used for treating the gas in reaction vessel 8 and the resulting mixture of chloride and nitrate introduced into reaction vessel 1 where the metal chloride unreacted with nitrogen peroxide is decomposed by means of nitric acid supplied to reaction vessel 1 to form the metal nitrate. The gas containing nitrosyl chloride and chlorine leaving reaction vessel 8 is passed to heat exchanger 2 and oxidation chamber 3 for oxidation of its nitrosyl chloride.

The process of this example is described in my copending application Serial No. 697,241, filed November 9, 1939, Patent 2,150,669, of which the present application is a continuation-in-part.

*Example 2.*—With reference to Fig. 2, the numeral 11 designates a reaction vessel to which sodium chloride and nitric acid are supplied and in which they are reacted to form a solution of sodium nitrate and evolve a gaseous mixture of nitrosyl chloride and chlorine. This gaseous mixture is introduced into a fractionation column 12, where the chlorine is separated from the nitrosyl chloride and escapes from the top of the column. Liquid nitrosyl chloride drawn from the bottom of column 12 and liquid nitrosyl chloride from a condenser 13 are mixed with air, vaporized and passed through an oxidizer 14 in which the nitrosyl chloride is partially oxidized to form a gaseous mixture of nitrogen peroxide, chlorine and nitrosyl chloride. The liquid nitrosyl chloride is mixed with air at 20 atmospheres pressure in the proportion (by weight) of 1.05 parts of air to 1 part of nitrosyl chloride. This is substantially the quantity of oxygen stoichiometrically required for oxidation of all of the nitrosyl chloride. In oxidizer 14 the gases are heated to 300° C. and about 80% of the nitrosyl chloride is oxidized to form a gas containing 1 mol of residual undecomposed nitrosyl chloride for every 4 mols NO₂ and 2 mols Cl₂. The gases leaving oxidizer 14 are passed through a condenser 15 in which they are cooled to −50° C. to liquefy the nitrogen peroxide, chlorine and nitrosyl chloride. The residual unliquefied gas is passed through one of two absorbers 16 and 16′ containing an absorbent for chlorine such as silica gel. The residual gases are vented from the absorber. When the silica gel in one absorber has taken up chlorine to its capacity, the gases from condenser 15 are passed through the other absorber while the air used for the oxidation of the nitrosyl chloride in oxidizer 14 is passed through the absorber containing silica gel in which chlorine has been absorbed, to recover the chlorine and return it to the gases passing through the oxidizer. In this way substantially all of the chlorine formed by oxidation of the nitrosyl chloride may be obtained in the condensate from condenser 15.

The mixture of liquefied nitrogen peroxide, chlorine and nitrosyl chloride drawn from condenser 15 is introduced into a fractionation column 17 in which a substantially pure chlorine gas is distilled from the condensate, leaving a residue of nitrogen peroxide and nitrosyl chloride containing about 26% by weight nitrosyl chloride. This residue is withdrawn from the bottom of column 17 as a liquid and introduced into a reaction vessel 18 in which it is mixed with 50% nitric acid at about 30° C. saturated with sodium nitrate and containing about 2% sodium chloride. The nitrogen peroxide reacts with the sodium chloride to form sodium nitrate which crystallizes from the solution as solid salt. As the amount of solid sodium nitrate in the liquid in reaction vessel 18 increases, the slurry is drawn to a filter 19 in which the solid is separated from the mother liquor and the mother liquor is returned to reaction vessel 18. Solid sodium chloride is introduced to the solution in vessel 18 at such a rate as to maintain the sodium chloride concentration in the liquid in that vessel at about 2%. Any incidental losses of water or nitric acid from the liquid circulating through reaction vessel 18 and filter 19 are supplied to the liquid. The nitrogen peroxide reacts with the solution of sodium chloride in nitric acid to evolve nitrosyl chloride which is drawn from reaction vessel 18 and liquefied, together with any unreacted nitrogen peroxide accompanying it, in condenser 13.

Pressures materially above atmospheric are maintained throughout the circulatory system comprising oxidizer 14, fractionation column 17, reaction vessel 18 and condenser 13. For example, a pressure of about 20 atmospheres is maintained in oxidizer 14, column 17 and condenser 13, and of about 4 atmospheres in reaction vessel 18. Compressors, not shown in the drawings, are provided for introducing the air and nitrosyl chloride from column 12 into this circulatory system, as well as for drawing the nitrosyl chloride from reaction vessel 18 and passing it into condenser 13 and thence into the air on its way to oxidizer 14. By maintaining in this circulatory system pressures materially above atmospheric, 10 to 20 atmospheres or more, the degree of oxidation of the nitrosyl chloride is increased. This is particularly beneficial when air is used to supply the oxygen required for the oxidation of the nitrosyl chloride. Furthermore, by carrying out the reaction of the nitrogen peroxide and solution of sodium chloride or other metal chloride under pressure, both the rate with which the reaction takes place and the completeness with which the nitrogen peroxide introduced into the reaction mixture is converted into nitrate and nitrosyl chloride are increased.

In the process of this example, instead of separating the nitrosyl chloride and chlorine from reaction vessel 11 in fractionation column 12, the gases from vessel 11 may be cooled to condense a liquid mixture of nitrosyl chloride and chlorine. The mixture of nitrosyl chloride and chlorine either may be sent direct to oxidizer 14 or be fractionated in column 17 with the condensate from condenser 15, to recover the chlorine from both condensates. In the latter case the mixture of nitrogen peroxide and nitrosyl chloride passed into vessel 18 contains the nitrosyl chloride from vessel 11. This nitrosyl chloride is liquefied in condenser 13, together with that formed by reaction of nitrogen peroxide and sodium chloride in vessel 18, and is passed to oxidizer 14 where it is oxidized to form nitrogen peroxide for production of the nitrate formed in vessel 18.

If desired, the nitrosyl chloride and chlorine from vessel 11 may be mixed with oxygen and the mixture treated to oxidize the nitrosyl chloride, either in oxidizer 14 with the nitrosyl chloride from reaction vessel 18 or in a separate oxidizer. In the latter case the oxidation products may be introduced into the cyclic system comprising fractionation column 17 and reaction vessel 18 for separation of the nitrogen peroxide and nitrosyl chloride from the chlorine and reaction of the nitrogen peroxide with metal chloride.

Instead of recovering nitrate from the liquid leaving reaction vessel 18, this liquid with the nitrate contained therein, may be introduced into reaction vessel 11 where the nitric acid may be reacted with sodium chloride to form sodium nitrate and a mixture of nitrosyl chloride and chlorine. Fresh sodium chloride in nitric acid is then supplied to vessel 18 for reaction with the nitrogen peroxide.

In both the processes of Examples 1 and 2 above, methods other than those shown and described in connection with these examples may be employed for recovering the chlorine, both that produced by reaction of the nitric acid and metal chloride and that produced by oxidizing nitrosyl chloride from the gases accompanying this chlorine. Thus, the process of Example 1 may be modified to pass the gas leaving heat exchanger 2 through a condenser in which the nitrogen peroxide, chlorine and nitrosyl chloride are liquefied. The condensate thus obtained may be fractionally distilled to recover the nitrogen peroxide and nitrosyl chloride separate from the chlorine as in the process of Example 2. If desired, other liquid absorbents for nitrogen peroxide and nitrosyl chloride may be substituted for the nitric acid used in Example 1. In the process of Example 2 the nitrosyl chloride-chlorine gas leaving reaction vessel 11 may be treated to oxidize the nitrosyl chloride without first separating it from the chlorine and the chlorine produced by the reaction of the metal chloride and nitric acid may be recovered from the oxidation products in one and the same step as that in which the chlorine obtained by oxidation of nitrosyl chloride is recovered before the nitrogen peroxide with which that chlorine is mixed is reacted with the metal chloride.

I claim:

1. The process for the production of a metal nitrate and chlorine which comprises reacting nitric acid and metal chloride under conditions resulting in the formation of metal nitrate and evolution of chlorine of the metal chloride as a mixture of nitrosyl chloride and chlorine, oxidizing said nitrosyl chloride to nitrogen peroxide and chlorine, separating the nitrogen peroxide from the chlorine, reacting the thus separated nitrogen peroxide in a circulatory system with a metal chloride under conditions resulting in the formation of metal nitrate with chlorine being evolved from the metal chloride substantially only as nitrosyl chloride, and in said system circulating the nitrosyl chloride thus produced and oxidizing it to nitrogen peroxide and chlorine, separating the nitrogen peroxide from the chlorine, and reacting the nitrogen peroxide thus obtained with metal chloride together with the aforesaid nitrogen peroxide.

2. The process for the production of a metal nitrate and chlorine which comprises reacting nitric acid and metal chloride under conditions resulting in the formation of metal nitrate and evolution of chlorine of the metal chloride as a mixture of nitrosyl chloride and chlorine, introducing said nitrosyl chloride into a circulatory system in which the nitrosyl chloride is oxidized to form nitrogen peroxide and chlorine, the nitrogen peroxide is separated from the chlorine and is thereafter reacted with a metal chloride under conditions resulting in the formation of metal nitrate with chlorine being evolved from the metal chloride substantially only as nitrosyl chloride, and the nitrosyl chloride thus produced is recycled for oxidation to nitrogen peroxide and chlorine and reaction of the nitrogen peroxide with metal chloride after separation from the chlorine.

3. The process for the production of a metal nitrate and chlorine which comprises reacting metal chloride with nitric acid to form metal nitrate and a mixture of nitrosyl chloride and chlorine, oxidizing the nitrosyl chloride thus formed to produce a gas containing nitrogen peroxide and chlorine, separating the nitrogen peroxide from the chlorine in said gas, thereafter reacting the nitrogen peroxide with an excess of metal chloride to form the metal nitrate mixed with the unreacted excess of the metal chloride and nitrosyl chloride, oxidizing said last mentioned nitrosyl chloride to nitrogen peroxide and chlorine and reacting the nitrogen peroxide thus produced after separating it from the chlorine with the aforesaid metal chloride in excess and introducing said mixture of metal nitrate and unreacted excess metal chloride into the reaction mixture in which said nitric acid and metal chloride are reacted to convert the metal chloride to metal nitrate and evolve nitrosyl chloride and chlorine.

4. The process for the production of chlorine and a metal nitrate which comprises reacting a metal chloride with nitric acid to form metal nitrate and a gaseous mixture of nitrosyl chloride and chlorine, introducing said nitrosyl chloride into a circulatory system in which nitrosyl chloride is continuously circulated and in that system partially oxidizing the nitrosyl chloride by reaction with oxygen, cooling the resulting gaseous mixture of nitrogen peroxide, chlorine and undecomposed nitrosyl chloride to condense a liquid mixture of said nitrogen peroxide, chlorine and nitrosyl chloride, distilling with fractionation said liquid mixture to recover chlorine separate from the nitrogen peroxide, introducing the nitrogen peroxide separated from the chlorine into direct contact with a solution of a metal chloride in aqueous nitric acid and reacting the nitrogen peroxide with the metal chloride to form metal nitrate and evolve the chlorine of the metal chloride substantially only as nitrosyl chloride gas which is recirculated in said system.

5. The process for the production of chlorine and a metal nitrate which comprises reacting a metal chloride with nitric acid to form metal nitrate and a gaseous mixture of nitrosyl chloride and chlorine, condensing said nitrosyl chloride and chlorine, distilling with fractionation the liquid condensate thus formed to separate the chlorine from the nitrosyl chloride, introducing said nitrosyl chloride into a circulatory system in which nitrosyl chloride is continuously circulated and in that system partially oxidizing the nitrosyl chloride circulated therein by reaction with oxygen, cooling the resulting gaseous mixture of nitrogen peroxide, chlorine and undecomposed nitrosyl chloride to condense a liquid mixture of said nitrogen peroxide, chlorine and nitrosyl chloride, distilling with fractionation said liquid mixture to recover chlorine therefrom and to leave a mixture of nitrogen peroxide and nitrosyl chloride, introducing the last mentioned mixture into direct contact with a solution of a metal chloride in aqueous nitric acid and reacting the nitrogen peroxide with the metal chloride to form metal nitrate and evolve the chlorine of the metal chloride substantially only as nitrosyl chloride gas which is recirculated in said system, withdrawing solution of metal nitrate from said circulatory system, separating solid nitrate from the withdrawn solution and introducing the mother liquor from which solid nitrate has been separated together with additional metal chloride into contact in said circulatory system with the mixture of nitrogen peroxide and nitrosyl chloride.

6. The process for the production of a metal nitrate and chlorine which comprises continuously circulating nitrosyl chloride in a circulatory system and in that system partially oxidizing the nitrosyl chloride by reaction with oxygen, cooling the resulting mixture of nitrogen peroxide, chlorine and undecomposed nitrosyl chloride to condense a liquid mixture of said nitrogen peroxide, chlorine and nitrosyl chloride, distilling with fractionation said liquid mixture to recover chlorine and leave a mixture of nitrogen peroxide and nitrosyl chloride, introducing the mixture of nitrogen peroxide and nitrosyl chloride thus obtained into direct contact with a solution of a metal chloride in aqueous nitric acid and reacting the nitrogen peroxide with the metal chloride to form metal nitrate and evolve the chlorine of the metal chloride substantially only as nitrosyl chloride gas which is recirculated in said system, continuously supplying to said circulatory system nitrosyl chloride to replace fixed nitrogen converted therein into metal nitrate, withdrawing solution of metal nitrate from said circulatory system, cooling the withdrawn solution to crystallize solid nitrate and separating the crystallized nitrate from the mother liquor, and introducing the mother liquor together with additional metal chloride into contact in said circulatory system with the mixture of nitrogen peroxide and nitrosyl chloride.

7. The process for the production of a metal nitrate and chlorine which comprises mixing nitrosyl chloride with air, partially oxidizing the nitrosyl chloride by reaction with the oxygen of said air to form a mixture of nitrogen peroxide, chlorine and residual unoxidized nitrosyl chloride, cooling the resulting mixture of gases to condense therefrom a liquid mixture of nitrogen peroxide, chlorine and nitrosyl chloride leaving uncondensed the inert gases in said mixture of gases, passing the inert gases containing residual uncondensed chlorine in contact with an absorbent for the chlorine, recovering the chlorine from the absorbent and introducing it into the mixture of nitrosyl chloride and air in which the nitrosyl chloride is oxidized, distilling with rectification the aforesaid condensed liquid mixture to separate the chlorine from the nitrogen peroxide and nitrosyl chloride and introducing the mixture of nitrogen peroxide and nitrosyl chloride thus obtained into contact with a solution of a metal chloride in aqueous nitric acid and reacting the nitrogen peroxide with the metal chloride in said solution to form a metal nitrate and evolve the chlorine of the metal chloride substantially only as nitrosyl chloride gas.

8. The process for the production of a metal nitrate and chlorine which comprises mixing nitrosyl chloride with an oxygen gas, partially oxidizing the nitrosyl chloride by reaction with said oxygen gas to form a mixture of nitrogen peroxide, chlorine and residual unoxidized nitrosyl chloride, separating the chlorine from the nitrogen peroxide and nitrosyl chloride, introducing the mixture of nitrogen peroxide and nitrosyl chloride thus obtained into contact with a solution of a metal chloride in aqueous nitric acid and reacting the nitrogen peroxide with said solution under conditions resulting in the formation of metal nitrate with chlorine being evolved from the metal chloride substantially only as nitrosyl chloride and, throughout the course of said process, maintaining said nitrosyl chloride and mixture of nitrosyl chloride and nitrogen peroxide under pressures materially above atmospheric.

9. The process for the production of a metal nitrate and chlorine which comprises reacting nitric acid and metal chloride under conditions resulting in the formation of metal nitrate and evolution of chlorine of the metal chloride as a mixture of nitrosyl chloride and chlorine, oxidizing said nitrosyl chloride to form a mixture of nitrogen peroxide, chlorine and residual undecomposed nitrosyl chloride, separating from said mixture a substantially pure chlorine product, reacting the nitrogen peroxide accompanied by nitrosyl chloride in a circulatory system with a metal chloride under conditions resulting in the formation of metal nitrate with chlorine being evolved from the metal chloride substantially only as nitrosyl chloride, and in said system circulating the nitrosyl chloride thus produced and oxidizing it to form a mixture of nitrogen peroxide, chlorine and residual undecomposed nitrosyl chloride, separating from said mixture a substantially pure chlorine product and reacting the nitrogen peroxide accompanied by nitrosyl chloride thus obtained with metal chloride together with the aforesaid nitrogen peroxide.

10. The process for the production of a metal nitrate and chlorine which comprises reacting nitric acid and metal chloride under conditions resulting in the formation of metal chloride and evolution of chlorine of the metal chloride as a mixture of the nitrosyl chloride and chlorine, oxidizing said nitrosyl chloride to form a mixture of nitrogen peroxide, chlorine and residual unoxidized nitrosyl chloride, recovering from said mixture substantially pure chlorine product, reacting the nitrogen peroxide accompanied by the nitrosyl chloride in a circulatory system with a solution of a metal chloride in aqueous nitric acid to form metal nitrate and evolve the chlorine of the metal chloride substantially only as nitrosyl chloride gas which is recirculated in said system and oxidized therein to form a mixture of nitrogen peroxide, chlorine and residual unoxidized nitrosyl chloride from which mixture pure chlorine is recovered and the nitrogen peroxide thereof accompanied by the nitrosyl chloride is returned for reaction with said solution of metal chloride together with additional nitrogen peroxide and nitrosyl chloride from which the first mentioned substantially pure chlorine product has been separated.

HERMAN A. BEEKHUIS, Jr.